United States Patent [19]

Klein et al.

[11] 3,898,522

[45] Aug. 5, 1975

[54] TELEVISION RECEIVER POWER SUPPLY SYSTEM AND PROTECTIVE CIRCUITRY THEREFOR

[75] Inventors: Arthur Harold Klein, Oakfield; Robert Charles Wheeler, Elba, both of N.Y.

[73] Assignee: GTE Sylvania Incorporated, Stamford, Conn.

[22] Filed: Dec. 3, 1973

[21] Appl. No.: 420,765

[52] U.S. Cl. .................................. 315/379; 323/60

[51] Int. Cl.$^2$ .......................................... H01J 29/52

[58] Field of Search ......... 315/27 R, 27 TD, 28, 29, 315/20, 379, 381, 380, 386, 399, 408; 323/44, 60

[56] References Cited

UNITED STATES PATENTS

| | | | |
|---|---|---|---|
| 3,502,941 | 3/1970 | Buechel | 315/27 TD |
| 3,629,644 | 12/1971 | Waybright | 315/29 |
| 3,767,960 | 10/1973 | Ahrens | 315/27 TD |
| 3,819,979 | 6/1974 | Truskalo | 315/29 |

*Primary Examiner*—Maynard R. Wilbur
*Assistant Examiner*—J. M. Potenza
*Attorney, Agent, or Firm*—Norman J. O'Malley; Robert E. Walrath; Cyril A. Krenzer

[57] ABSTRACT

A system of interdependent power supplies for a television receiver is disclosed. A first power supply provides an energization voltage to deflection apparatus that includes an output transformer. Additional voltages are developed by dependent power supplies which rectify voltages developed in primary or secondary windings on the output transformer. At least one of the dependent power supplies includes protective circuitry to disable the deflection apparatus when excessive current is drawn from that power supply. In addition, protective circuitry associated with the power supply for energizing the deflection apparatus utilizes common circuitry to disable the deflection apparatus in response to excessive voltages from that power supply.

12 Claims, 1 Drawing Figure

PATENTED AUG 5 1975 3,898,522
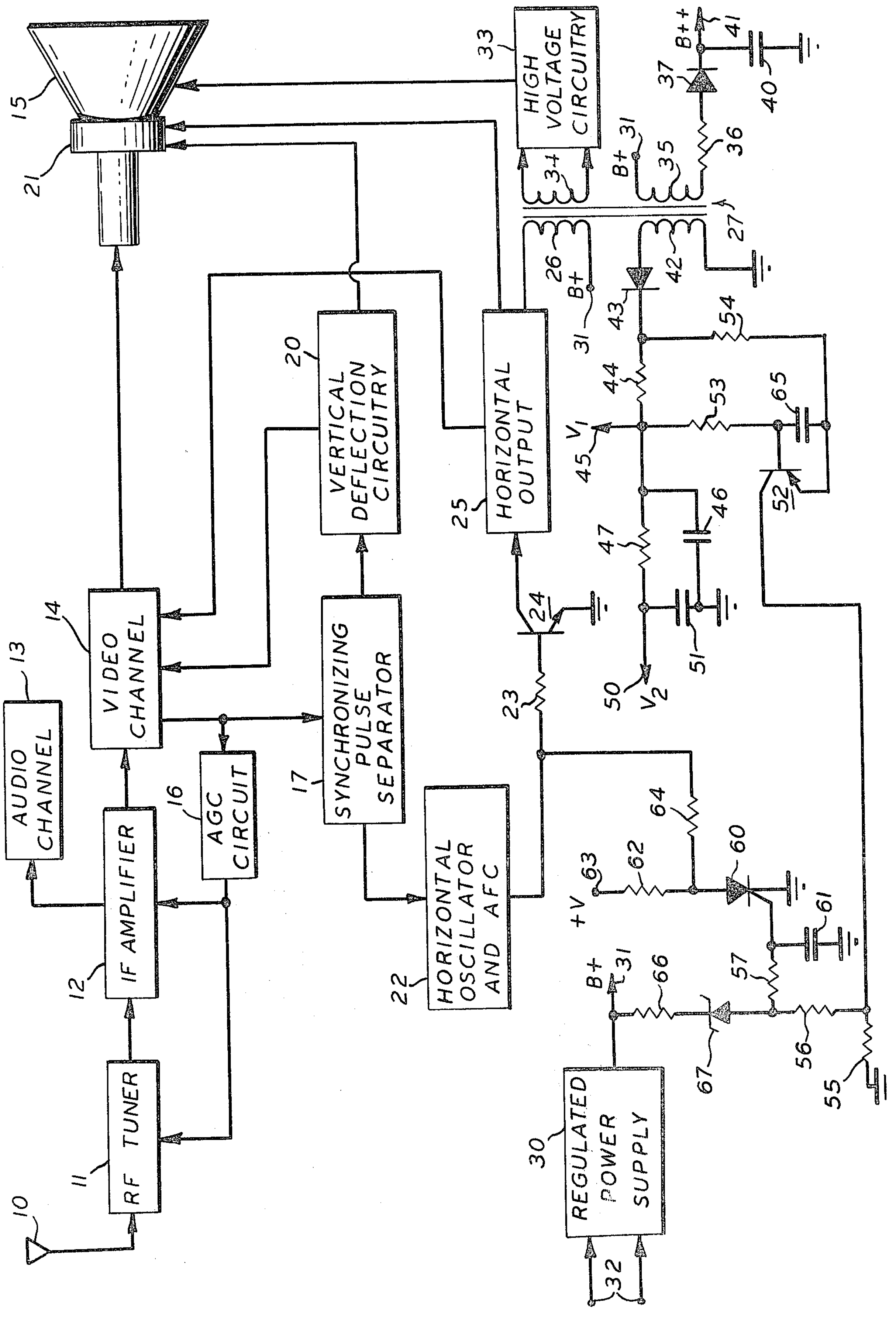

TELEVISION RECEIVER POWER SUPPLY SYSTEM AND PROTECTIVE CIRCUITRY THEREFOR

CROSS-REFERENCE TO RELATED APPLICATIONS

D. E. Manners, "Voltage Regulator Short Circuit Protection," Ser. No. 345,980, filed Mar. 29, 1973; D. E. Manners "Voltage Protection Circuit," Ser. No. 359,614, filed May 11, 1973;, now Pat. No. 3,858,084 H. J. Radloff, "Voltage Regulator with Saturation Protection," Ser. No. 388,252, filed Aug. 14, 1973;, now U.S. Pat. No. 3,836,840 and all assigned to the same assignee as the present invention.

BACKGROUND OF THE INVENTION

This invention relates to power supply systems and more particularly to interdependent power supply systems for television receivers. Television receivers commonly use interdependent power supplies wherein an independent power supply develops a regulated voltage from the line voltage. The regulated voltage is used to energize the deflection apparatus. Dependent power supplies are used to develop additional energization voltages from the deflection apparatus. Typically, the high voltages used to energize or bias the cathode ray tube are developed in this manner from secondary windings on the horizontal output transformer. Also, typically, regulation of the independent supply provides adequate regulation of the dependent power supplies.

In television receivers, particularly those utilizing solid state components, excessive voltages and/or currents can destroy or damage numerous expensive components. Numerous forms of protective circuitry have been proposed in the prior art, however, none of the known prior art techniques have solved this problem in a wholly satisfactory manner. Some typical prior art power supply systems rely on fuses or circuit breakers for protection, however, such components may not respond quickly enough to prevent component damage or destruction. Also, fuses are not resettable but must be replaced by the user. Other forms of protective circuitry associated with the independent power supply, while providing satisfactory operation for the intended purpose, may not be sufficiently sensitive to protect against excessive currents drawn by a low voltage dependent power supply. While other forms of protective circuitry are known in the prior art, in general prior art techniques suffer from a number of disadvantages such as expensive circuit designs and/or components, complex circuitry, deleterious effect on circuit operation, low sensitivity, and similar other disadvantages.

OBJECTS AND SUMMARY OF THE INVENTION

Accordingly, it is a primary object of this invention to obviate the above-noted and other disadvantages of the prior art.

It is a further object of this invention to provide a new and novel power supply system for television receivers incorporating protective circuitry.

It is a still further object of this invention to provide protective circuitry that provides a positive indication of fault conditions.

It is yet another object of this invention to provide simple, economical, and reliable protective circuitry.

It is a still further object of this invention to provide an interdependent power supply system requiring only one regulator to regulate all voltage sources.

It is another object of this invention to provide a low voltage interdependent power supply with low impedance.

In one aspect of this invention these and other objects and advantages are achieved in power supply means for a television receiver having an image display device and deflection apparatus associated therewith wherein the deflection apparatus includes a deflection circuit and an output transformer connected thereto. The power supply means includes means for providing an energizing voltage to the deflection apparatus, a primary or secondary winding on the output transformer, and rectifying means connected to the winding for providing a unidirectional voltage. Current sensing means connected to the rectifying means provides an output signal indicative of current flow through the rectifying means in excess of a predetermined magnitude, and switching means connected to the current sensing means and to the deflection circuit disables the deflection circuit in response to the output signal from the current sensing means.

BRIEF DESCRIPTION OF THE DRAWING

The sole FIGURE is a block and schematic diagram of a television receiver incorporating one embodiment of the invention.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawing.

In the drawing typical television receiver components are illustrated in block diagram form. A typical television receiver includes an antenna 10 or other similar means for intercepting or receiving a television signal which is coupled to a radio frequency (RF) tuner 11. Tuner 11 heterodynes the received signal to an intermediate frequency (IF) which is coupled to an IF amplifier 12. IF amplifier 12 couples at least the audio portion of the received signal to an audio channel 13 and at least the video portion to a video channel 14. Video channel 14 processes the composite video signal to provide one or more signals to an image display device illustrated as a cathode ray tube (CRT) 15. The composite video signal is also coupled from video channel 14 to an automatic gain control (AGC) circuit 16 which provides AGC signals to tuner 11 and amplifier 12. The composite video signal is also coupled to a synchronizing pulse separator 17 which couples separated synchronizing pulses to the deflection apparatus.

The deflection apparatus includes vertical deflection circuitry 20 which provides vertical deflection signals to a vertical deflection winding contained in a deflection yoke 21 associated with CRT 15. Vertical deflection circuitry 20 also provides suitable blanking signals to video channel 14. The deflection apparatus further includes a horizontal deflection circuit including a horizontal oscillator and automatic frequency control (AFC) circuit 22 which provides output signals at the line scanning rate of CRT 15. The output signals from horizontal oscillator 22 are coupled by a resistor 23 to a base of a driver transistor 24. An emitter of transistor 24 is connected to circuit ground while a collector is connected to a horizontal output circuit 25 which provides a horizontal deflection signal to a horizontal deflection winding contained in deflection yoke 21. Horizontal output circuit 25 also couples output signals to a primary winding 26 of an output transformer 27.

Power supply means in accordance with the invention includes an independent power supply illustrated as a regulated power supply 30 which provides a regulated B+ voltage at a terminal 31. Regulated power supply 30 derives the B+ voltage, for example, from ordinary 60 Hz line voltage applied at terminals 32. The B+ voltage at terminal 31 is used to energize circuitry in the television receiver such as horizontal output circuit 25 of the horizontal deflection circuit. For example, in one practical embodiment of the invention horizontal output circuit 25 is energized through primary winding 26 of output transformer 27 by connecting one end of primary winding 26 to terminal 31. A collector bias of transistor 24 can also be derived from the B+ voltage at terminal 31.

A power supply system in accordance with the invention also includes various dependent power supplies derived from primary and/or secondary windings of output transformer 27. For example, voltages used as the second anode and focus voltages for CRT 15 are commonly derived by high voltage circuitry 33 which rectifies pulses provided by a secondary winding 34 on output transformer 27. High voltage circuitry 33 can include a diode voltage multiplier. A secondary winding 35 on output transformer 27 has one end connected to terminal 31 and the other end connected by a resistor 36 to a rectifier 37. Rectifier 37 rectifies pulses from secondary winding 35 to provide an energizing voltage B++ across a capacitor 40, and hence, at terminal 41. Energizing voltage B++ has a magnitude greater than the B+ voltage and can be used to bias circuitry such as the output amplifiers of video channel 14.

Another winding 42 on output transformer 27 has one end connected to circuit ground and the other end connected to a rectifying means illustrated as a diode 43. Winding 42 is illustrated as a secondary winding, however, in practice a portion of a split primary winding has been satisfactorily used as winding 42. Diode 43 is connected by a current sensing resistor 44 to a terminal 45. Terminal 45 is connected by a filter capacitor 46 to circuit ground. Terminal 45 is further connected by a dropping resistor 47 to a terminal 50 which is connected by a filter capacitor 51 to circuit ground. The dependent power supply including winding 42 and diode 43 provides a first unidirectional voltage $V_1$ at terminal 45 and a second unidirectional voltage $V_2$ at terminal 50. $V_1$ and $V_2$ are of lower magnitude than the B+ voltage at terminal 31 and are used to energize various other circuits in the television receiver which require lower bias voltages such as vertical deflection circuitry 20, audio channel 13, etc.

If a circuit fault should occur such as a short circuit from one of terminals 45 or 50 to ground, excessive current can be drawn by the dependent power supply. While a circuit breaker will normally be included in the television receiver, for example, at the input of power supply 30, substantial damage to components in the power supply system and the horizontal deflection circuit as well as to components in other parts of the television receiver can occur before the circuit breaker opens.

In accordance with the invention, however, protective circuitry is included to sense current through diode 43 in excess of a predetermined magnitude. The current sensing means includes resistor 44 and a transistor 52 which has a base connected by a resistor 53 to terminal 45 and an emitter connected by a resistor 54 to a junction between diode 43 and resistor 44. If the current through current sensing resistor 44 becomes sufficient to switch transistor 52 on, current will flow from diode 43 through resistor 54, transistor 52, and a resistor 55 connected between the collector of transistor 52 and circuit ground. This output signal from transistor 52 is coupled via series resistors 56 and 57 to a switching means illustrated as a controlled rectifier or SCR 60.

SCR 60 has a cathode connected to circuit ground and a gate connected to resistor 57 and by a filter capacitor 61 to circuit ground. An anode of SCR 60 is connected by a resistor 62 to a source of energizing voltage illustrated as a terminal 63. The anode of SCR 60 is further connected by a resistor 64 to resistor 23, and hence, the base of transistor 24.

When an output signal from the current sensing means including transistor 52 occurs, SCR 60 becomes conductive thereby coupling the junction of resistors 62 and 64 to circuit ground to remove the base drive of transistor 24. Hence, the horizontal deflection circuit is disabled by switching it to an inoperative condition by biasing transistor 24 off in response to the output signal from the current sensing means. Source 63 is preferably independent of voltages $V_1$ and $V_2$ to keep SCR 60 conductive when voltages $V_1$ and $V_2$ are not generated due to the disablement of the horizontal deflection circuit.

When the television receiver is turned off, capacitors 46 and 51 as well as other capacitors that may be coupled to terminals 45 and 50 discharge. When the receiver is initially turned on, these capacitors will charge to their operating voltages thereby drawing substantial current through resistor 44. A filter capacitor 65 is connected between the base and emitter of transistor 52 to prevent transistor 52 from providing an output signal sufficient to cause SCR 60 to become conductive during initial operation of the television receiver. Capacitor 65 also prevents transistor 52 from turning on due to momentary excess currents.

Windings 26 and 42 are wound such that diode 43 conducts during trace portions of the scanning of cathode ray tube 15. Rectification of the pulses from winding 42 during trace intervals rather than during retrace intervals results in a low impedance supply because diode 43 conducts for relatively long time periods rather than the relatively short retrace intervals. A low impedance dependent supply is important because it permits a single regulated power supply such as supply 30 to be used to regulate all voltage sources. If the low voltage supply were a high impedance supply, it would deleteriously effect voltage regulation during changes in load conditions.

Terminal 31 is connected by a voltage sensing means illustrated as a resistor 66 in series with a zener diode 67 to the junction between resistors 56 and 57. If a voltage in excess of a predetermined magnitude occurs at terminal 31, a current will flow through resistor 66, zener diode 67, and resistors 56 and 55 to switch SCR 60 on thereby disabling the horizontal deflection circuit. Accordingly, a single switching means is used to provide protection against excess voltages from regulated power supply 30 as well as to protect against excess currents drawn from the low voltage dependent power supply. The switching means is also self-resetting when the television receiver is turned off. Accordingly, if the fault that caused SCR 60 to become conductive disappears, the television receiver will be operative when it is turned on again. If the fault continues, however, SCR 60 will again become conductive to disable the horizontal deflection circuit.

Accordingly, a novel power supply system in accordance with the invention has been illustrated and described. The power supply system in accordance with the invention possesses numerous advantages over the prior art including those enumerated above.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having an image display device and deflection apparatus associated therewith, said deflection apparatus including a deflection circuit and an output transformer connected thereto, power supply means comprising:

means connected to said deflection apparatus for providing energizing voltage to said deflection apparatus;

a winding on said output transformer;

rectifying means connected to said winding for providing a unidirectional voltage by rectification of pulses from said winding during the trace portion of the scanning of said image display device;

current sensing means connected to said rectifying means for providing an output signal indicative of current flow through said rectifying means in excess of a predetermined magnitude; and switching means connected to said current sensing means and to said deflection circuit for switching said deflection circuit to an inoperative condition in response to said output signal.

2. Power supply means as defined in claim 1 wherein said current sensing means includes a transistor biased to conduct in response to current flow through said rectifying means in excess of a predetermined magnitude.

3. Power supply means as defined in claim 2 wherein said current sensing means further includes a filter capacitor connected in circuit with said transistor for preventing conduction thereby during initial operation of the television receiver.

4. Power supply means as defined in claim 1 wherein said deflection circuit includes an oscillator and a driver transistor connected thereto and said switching means includes a controlled rectifier for switching said driver transistor to an inoperative condition in response to said output signal from said current sensing means.

5. Power supply means as defined in claim 4 wherein said means for providing energizing power to said deflection apparatus is a regulated power supply including voltage sensing means for providing an output signal in response to voltages from said regulated power supply exceeding a threshold, and means connecting said voltage sensing means to said controlled rectifier, said controlled rectifier switching said driver transistor to an inoperative condition in response to said output signal from said voltage sensing means.

6. In a television receiver having a cathode ray tube and horizontal and vertical deflection apparatus associated therewith, said horizontal deflection apparatus including a deflection circuit and an output transformer connected thereto, power supply means comprising:

a regulated power supply connected to said horizontal deflection apparatus for providing an energization voltage thereto;

a winding on said output transformer;

rectifying means connected to said winding for providing a unidirectional voltage in response to signals from said winding;

current sensing means connected to said rectifying means for providing an output signal indicative of current flow through said rectifying means in excess of a predetermined magnitude; and switching means connected to said current sensing means and to said deflection circuit for disabling said deflection circuit in response to said output signal.

7. Power supply means as defined in claim 6 wherein said regulated power supply includes voltage sensing means for providing an output signal in response to a voltage in excess of a predetermined magnitude, and means connecting said voltage sensing means to said switching means for disabling said deflection circuit in response to said output signal from said voltage sensing means.

8. Power supply means as defined in claim 7 wherein said switching means includes a controlled rectifier connected to become conductive in response to said output signals from said current and voltage sensing means.

9. Power supply means as defined in claim 8 wherein said deflection circuit includes a driver transistor and said controlled rectifier is connected thereto to switch said driver transistor to an inoperative condition in response to said output signals.

10. Power supply means as defined in claim 6 wherein said current sensing means includes a current sensing resistor connected in series with said rectifying means and a transistor having a base and emitter circuit connected in parallel with said current sensing resistor for becoming conductive when the current through said current sensing resistor exceeds said predetermined magnitude.

11. Power supply means as defined in claim 10 wherein said current sensing means further includes a filter capacitor connected between the base and emitter of said last-named transistor for preventing conduction thereby during initial operation of the television receiver.

12. Power supply means as defined in claim 11 wherein said rectifying means conducts current in response to pulses from said winding during the trace portion of the scanning of said cathode ray tube.

* * * * *